US010393021B2

(12) United States Patent
Smith, III et al.

(10) Patent No.: US 10,393,021 B2
(45) Date of Patent: Aug. 27, 2019

(54) PARTICLE SEPARATOR

(71) Applicant: Rolls-Royce North American Technologies, Inc., Indianapolis, IN (US)

(72) Inventors: Crawford F. Smith, III, Carmel, IN (US); Victor Oechsle, Avon, IN (US); Philip Snyder, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 99 days.

(21) Appl. No.: 15/637,646

(22) Filed: Jun. 29, 2017

(65) Prior Publication Data

US 2018/0058323 A1    Mar. 1, 2018

Related U.S. Application Data

(60) Provisional application No. 62/382,557, filed on Sep. 1, 2016.

(51) Int. Cl.
| *F02C 7/052* | (2006.01) |
| *B01D 45/06* | (2006.01) |
| *B07B 1/22* | (2006.01) |
| *F02C 7/055* | (2006.01) |

(Continued)

(52) U.S. Cl.
CPC ............... *F02C 7/052* (2013.01); *B01D 45/04* (2013.01); *B01D 45/06* (2013.01); *B07B 1/22* (2013.01); *F02C 7/055* (2013.01); *F02K 3/04* (2013.01); *F05D 2240/12* (2013.01); *F05D 2250/191* (2013.01); *F05D 2250/411* (2013.01);

(Continued)

(58) Field of Classification Search
CPC .... F02C 7/052; F02C 7/30; F02C 9/18; F02C 7/0522; F05D 2260/607; B01D 45/00; B01D 45/16; B01D 45/02; B01D 45/04; B64D 33/02
See application file for complete search history.

(56) References Cited

U.S. PATENT DOCUMENTS

| 2,534,138 A | 12/1950 | Marshall et al. |
| 2,935,158 A | 5/1960 | Braun et al. |
| 3,319,402 A | 5/1967 | Wallace et al. |

(Continued)

FOREIGN PATENT DOCUMENTS

| EP | 0246039 A2 | 11/1987 |
| EP | 0330782 A1 | 9/1989 |

(Continued)

OTHER PUBLICATIONS

Inertial Particle Separator Multiphase Dynamics, Dominic L. Barone, Ph.D. Thesis, University of Virginia, Dec. 2013, 149 pages.

(Continued)

*Primary Examiner* — Mark A Laurenzi
*Assistant Examiner* — Shafiq Mian
(74) *Attorney, Agent, or Firm* — Barnes & Thornburg LLP

(57) ABSTRACT

An air-inlet duct includes an outer wall, an inner wall, and a splitter. The splitter cooperates with the outer wall and the inner wall to establish a particle separator which separates particles entrained in an inlet flow moving through the air-inlet duct to provide a clean flow of air to a compressor section of a gas turbine engine.

17 Claims, 4 Drawing Sheets

(51) Int. Cl.
*F02K 3/04* (2006.01)
*B01D 45/04* (2006.01)

(52) U.S. Cl.
CPC .... *F05D 2250/51* (2013.01); *F05D 2260/607* (2013.01); *Y02T 50/675* (2013.01)

(56) References Cited

U.S. PATENT DOCUMENTS

| | | | |
|---|---|---|---|
| 3,329,377 | A | 7/1967 | Gudmundur et al. |
| 3,702,049 | A | 11/1972 | Morris, Jr. |
| 3,998,048 | A * | 12/1976 | Derue .................. B64D 33/02 60/39.092 |
| 4,265,646 | A | 5/1981 | Weinstein et al. |
| 4,389,227 | A | 6/1983 | Hobbs et al. |
| 4,527,387 | A * | 7/1985 | Lastrina ................ F02C 7/052 244/53 B |
| 4,928,480 | A * | 5/1990 | Oliver .................. B64D 33/02 55/306 |
| 5,139,545 | A | 8/1992 | Mann et al. |
| 5,339,622 | A | 8/1994 | Bardey et al. |
| 6,508,052 | B1 | 1/2003 | Snyder et al. |
| 6,698,180 | B2 | 3/2004 | Snyder |
| 7,296,395 | B1 | 11/2007 | Hartman et al. |
| 7,608,122 | B2 * | 10/2009 | Snyder .................. F02C 7/052 55/306 |
| 7,678,165 | B2 * | 3/2010 | Tingle .................. F02C 7/052 55/306 |
| 7,708,122 | B2 | 5/2010 | Plantan et al. |
| 7,802,433 | B2 | 9/2010 | Higgins |
| 7,854,778 | B2 | 12/2010 | Groom et al. |
| 7,927,408 | B2 | 4/2011 | Sheoran et al. |
| 7,967,554 | B2 | 6/2011 | Bremer |
| 8,092,145 | B2 | 1/2012 | Martel et al. |
| 8,163,050 | B2 | 4/2012 | Belyew |
| 9,340,988 | B2 | 5/2016 | Lyristakis |
| 2005/0098038 | A1 | 5/2005 | Blake et al. |
| 2007/0095033 | A1 * | 5/2007 | Snyder .................. B01D 45/06 55/440 |
| 2010/0104422 | A1 * | 4/2010 | Martel .................. F02C 6/08 415/121.2 |
| 2010/0221100 | A1 * | 9/2010 | Snyder .................. B01D 45/02 415/121.2 |
| 2012/0131900 | A1 | 5/2012 | Kenyon et al. |
| 2013/0160411 | A1 * | 6/2013 | Mayer .................. F02C 7/052 55/418 |
| 2016/0265434 | A1 | 9/2016 | Snyder |
| 2016/0265435 | A1 * | 9/2016 | Snyder .................. F02C 7/057 |
| 2016/0363051 | A1 | 12/2016 | Snyder et al. |

FOREIGN PATENT DOCUMENTS

| | | |
|---|---|---|
| EP | 2382026 A1 | 11/2011 |
| EP | 2837797 A1 | 2/2015 |
| GB | 2270481 A | 3/1994 |

OTHER PUBLICATIONS

Intake Ground Vortex Aerodynamics, John Murphy, Ph.D. Thesis, Cranfield University, Dec. 2008, 330 pages.

Inlet Vortex Formation Under Crosswind Conditions, Nathan Rosendo Horvath, MS Thesis, Worcester Polytechnic Institute, Apr. 2013, 146 pages.

A.N. Smith and H.Babinsky; J.L. Fulker, P.R. Ashill, Normal shock wave-turbulent boundary-layer interactions in the presence of streamwise slots and grooves, The Aeronautical Journal, p. 493, Sep. 2002, 8 pages.

Extended European Search Report, European Application No. 17187211.2-1007, dated Jan. 23, 2018, 12 pages.

\* cited by examiner

PARTICLE SEPARATOR

CROSS REFERENCE TO RELATED APPLICATIONS

This application claims priority to and the benefit of U.S. Provisional Patent Application No. 62/382,557, filed 1 Sep. 2016, the disclosure of which is now expressly incorporated herein by reference.

STATEMENT REGARDING FEDERALLY SPONSORED RESEARCH OR DEVELOPMENT

Embodiments of the present disclosure were made with government support under Contract No. W911W6-15-2-0005. The government may have certain rights.

FIELD OF THE DISCLOSURE

The present disclosure relates generally to gas turbine engines, and more specifically to particle separators included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air inlet and communicated to the compressor via an air-inlet duct. In some operating conditions, particles may be entrained in the air such as dust, sand, or liquid water and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

One method of separating particles from air entering the compressor has been by inertial particle separation. Inertial particle separation uses the inertia of the particles to separate the particles from the air. As the air stream moves through the air-inlet duct, the air moves along a serpentine flow path and enters an engine channel of the air-inlet duct while the particles move along a generally linear travel path and enter a scavenge channel included in the air-inlet duct. In some instances, particles may enter the engine channel rather than the scavenge channel. Particles may deviate from the generally linear travel path due separation of flow from an outer wall of the air-inlet duct leading to recirculation of the particles and/or other fluid flow phenomenon upstream of the scavenge channel.

SUMMARY

The present disclosure may comprise one or more of the following features and combinations thereof.

An air-inlet duct may include an outer wall, an inner wall, and a splitter. The outer wall may be arranged circumferentially about an engine rotation axis of the air-inlet duct. The inner wall may be located radially between the outer wall and the engine rotation axis. The inner wall and the outer wall may cooperate to define an air-inlet passageway adapted to receive a mixture of air and particles suspended in the air. The splitter may be located radially between the outer wall and the inner wall and may be configured to separate the mixture of air and particles into a clean flow substantially free of particles and a dirty flow containing the particles. The dirty flow may be located adjacent the outer wall and the clean flow may be located radially between the dirty flow and the inner wall. The outer wall may be formed to include a plurality of apertures arranged to extend radially through the outer wall to block a wall-normal vortex from forming in the air-inlet passage ahead of the splitter so that a number of particles entering the clean flow is reduced.

In some embodiments, the splitter may include an outer splitter surface that cooperates with the outer wall to define a scavenge channel and an inner splitter surface that cooperates with the inner wall to define an engine channel. The splitter may be configured to direct the dirty flow into the scavenge channel and the clean flow into the engine channel.

In some embodiments, the outer splitter surface and the inner splitter surface may form a splitter rim. The plurality of apertures may include apertures located axially forward of the splitter rim.

In some embodiments, the air-inlet duct may further comprise a housing located radially outward of the outer wall. The housing may cooperate with the outer wall to define a cavity. The plurality of apertures may open into the cavity to provide fluid communication between the air-inlet passageway and the cavity.

In some embodiments, the housing may include a port arranged to direct air and particles out of the cavity. In some embodiments, the housing may be self-enclosed so that only the plurality of apertures is in fluid communication with the cavity.

In some embodiments, the plurality of apertures may include elongated slots arranged to extend axially relative to the engine rotation axis. In some embodiments, each of the plurality of apertures may be circular.

According to another aspect of the present disclosure an air-inlet duct may include an outer wall, an inner wall, a center body, and an intake duct. The outer wall may be arranged circumferentially about an engine rotation axis of the air-inlet duct. The outer wall may be formed to include a plurality of outer apertures that extend radially through the outer wall. The inner wall may be located radially between the outer wall and the engine rotation axis. The inner wall may be formed to include a plurality of inner apertures that extend radially through the inner wall. The inner wall and the outer wall may cooperate to define an air-inlet passageway adapted to receive a mixture of air and particles suspended in the air. The center body may be located radially between the outer wall and the inner wall and configured to separate the mixture of air and particles into an outer flow and an inner flow. The intake duct may be arranged to separate each of the outer and inner flows into a clean flow substantially free of particles and a dirty flow containing the particles and the inner duct being further to direct the clean flows into a compressor of a gas turbine engine.

In some embodiments, the intake duct may include an outer splitter. The plurality of outer apertures may be aligned axially with the outer splitter and a least one outer aperture may be located axially forward of the intake duct.

In some embodiments, the plurality of apertures may include elongated slots. The elongated slots may be arranged to extend axially relative to the engine rotation axis.

In some embodiments, the air-inlet duct may further comprise an inner housing located radially inward of the inner wall. The inner housing may cooperate with the inner wall to define an inner cavity. The plurality of inner apertures may open into the inner cavity to provide fluid communication between the inner flow and the inner cavity.

In some embodiments, the air-inlet duct may further comprise an outer housing located radially outward of the outer wall. The outer housing may cooperate with the outer wall to define an outer cavity. The plurality of outer apertures may open into the outer cavity to provide fluid communication between the outer flow and the outer cavity. In some embodiments, the inner and outer housings may be self-enclosed.

In some embodiments, the center body may include an outer body surface that cooperates with the outer wall to define the outer flow and an inner body surface that cooperates with the inner wall to define the inner flow. The intake duct may include an outer splitter that cooperates with the outer wall to define an outer scavenge channel and an inner splitter that cooperates with the inner wall to define an inner scavenge channel.

In some embodiments, the plurality of outer apertures may be spaced apart from one another circumferentially and axially. Each of the outer apertures may be circular.

According to another aspect of the present disclosure, a method of removing particles from air moving through an air-inlet duct adapted to be used with a gas-turbine engine may include a number of steps. The method may include providing an inlet flow including particles to an air-inlet duct of a gas-turbine engine, blocking a wall-normal vortex from forming within the particle separator in a region of the inlet flow, separating the inlet flow into a dirty flow including substantially all the particles and a clean flow lacking substantially all the particles, directing the dirty flow to a scavenge chamber, and directing the clean flow to a compressor included in the gas-turbine engine.

In some embodiments, the wall of the air-inlet duct may be formed to include a plurality of apertures. Blocking the wall-normal vortex from forming in the inlet flow may include directing the inlet flow along the wall.

In some embodiments, the method may further comprise directing a portion of the dirty flow through the plurality of apertures into a cavity. In some embodiments, the method may further comprise directing the portion of the dirty flow out of the cavity and into atmosphere surrounding the air-inlet duct. In some embodiments, the method may further comprise directing the portion of the dirty flow out of the cavity into a scavenge chamber.

These and other features of the present disclosure will become more apparent from the following description of the illustrative embodiments.

DETAILED DESCRIPTION OF THE DRAWINGS

Figure 1:
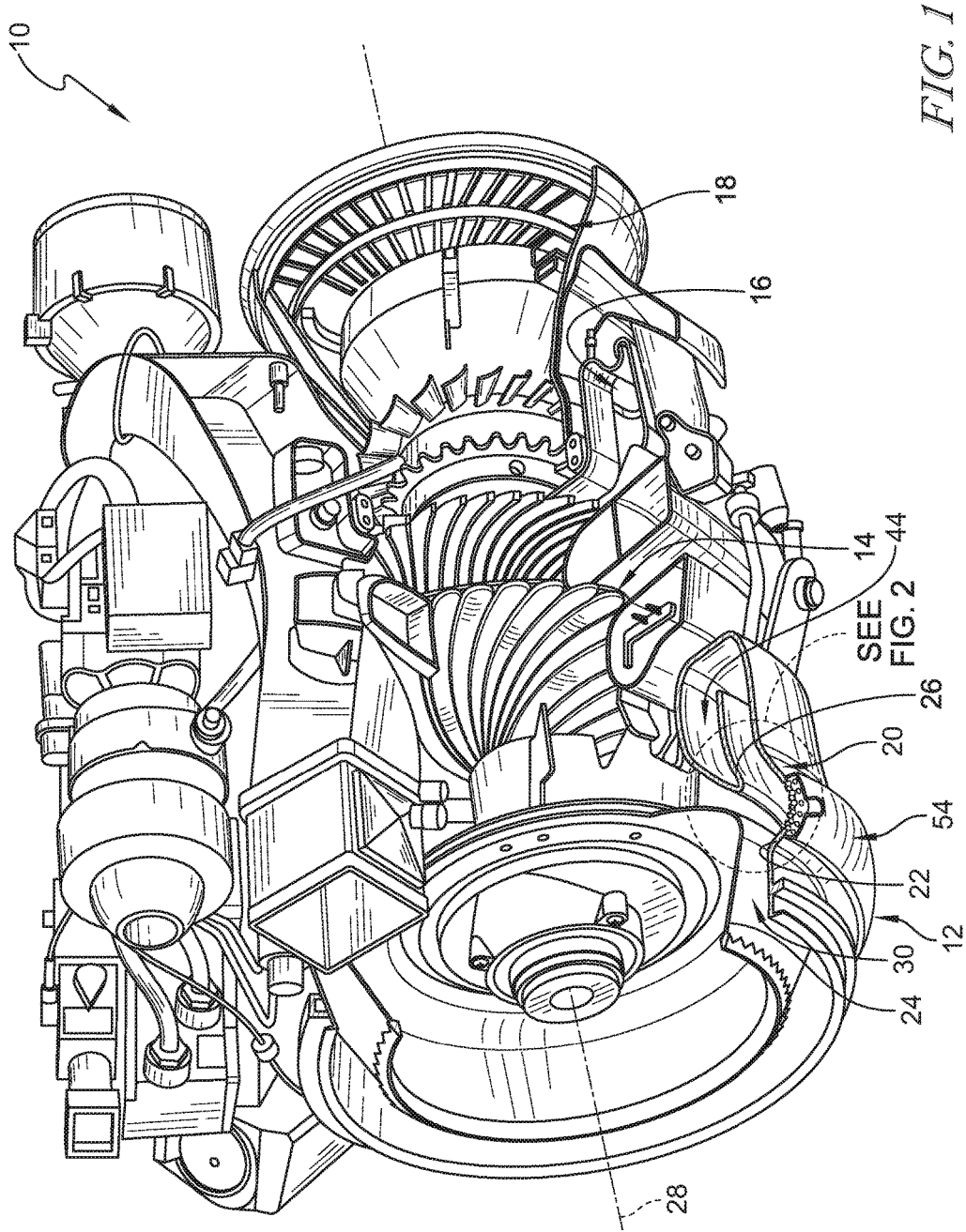
FIG. 1 is a cut-away perspective view of a gas turbine engine having an air-inlet duct in accordance with the present disclosure.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown, for example, in FIG. 1. The gas turbine engine 10 includes an air-inlet duct 12, a compressor section 14, a combustor section 16, and a turbine section 18. Air is drawn into the gas turbine engine through air-inlet duct 12 prior to admission of the air into the compressor section 14 as suggested in FIGS. 1 and 2. The compressor section 14 compresses air drawn into the engine 10 and delivers high-pressure air to the combustor section 16. The combustor section 16 is configured to ignite a mixture of the compressed air and fuel. Products of the combustion process are directed into the turbine section 18 where work is extracted to drive the compressor section 14 and a fan, propeller, output shaft, or gearbox.

In some environments, particles such as dirt, sand, or liquid water may be entrained in the air surrounding the engine 10 and carried into the gas turbine engine 10. The illustrative air-inlet duct 12 comprises a particle separator 20 configured to separate particles from the air to cause clean air substantially free from particles to be delivered to the compressor section 14 so that damage to the compressor section 14, combustor section 16, and turbine section 18 is minimized.

In some particle separators, natural phenomenon such as, for example, boundary layer separation may occur and can cause the airflow in the particle separator to become unsteady. Unsteady airflow may result in wall-normal vortexes being formed and reduce the performance of a particle separator such that less particulate is removed from a flow of air directed into the compressor section of an engine.

Figure 2:
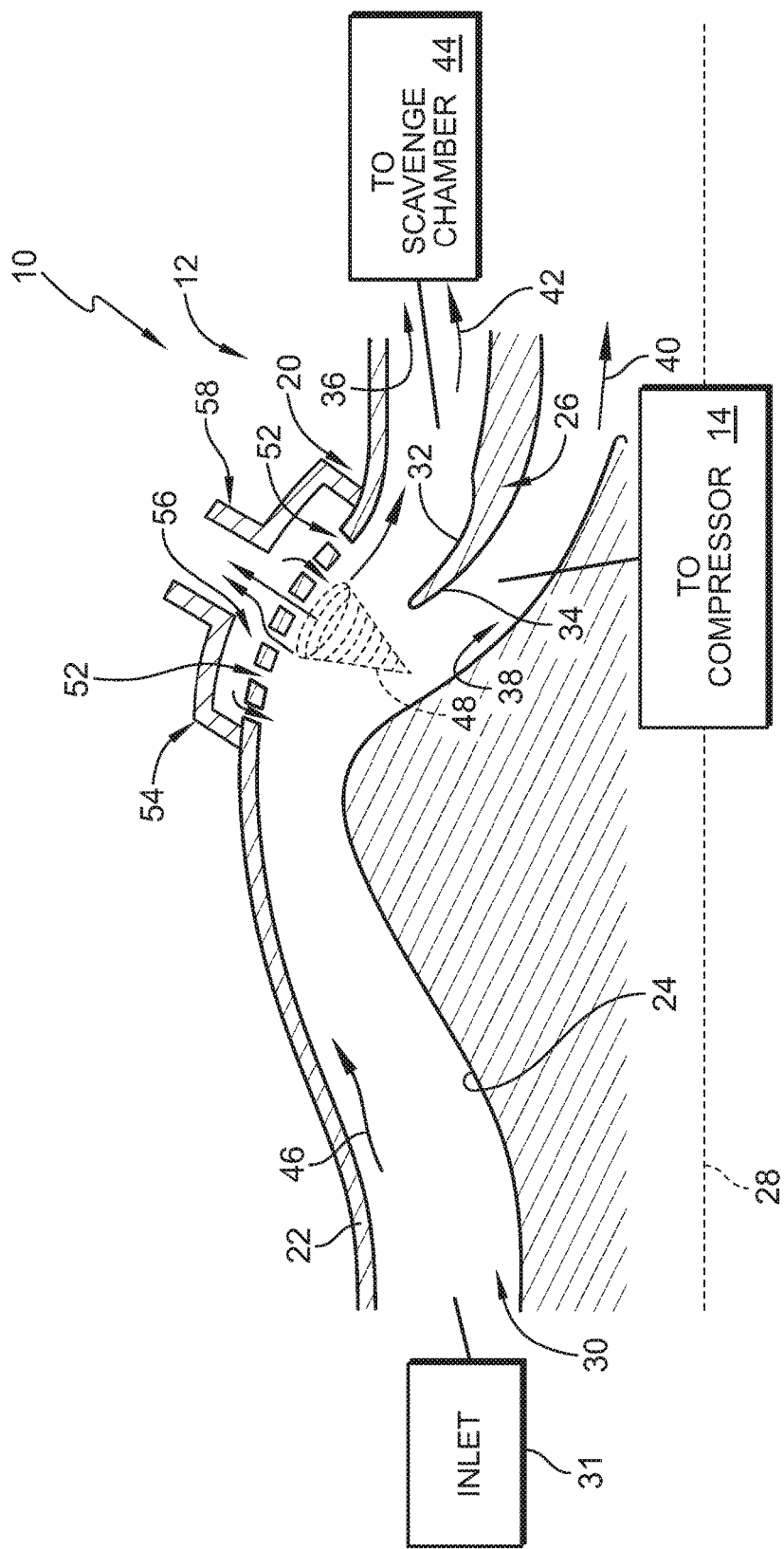
FIG. 2 is an enlarged partial view of the circled region of FIG. 1 showing that the air-inlet duct comprises a particle separator adapted to deliver clean air to a compressor of the engine and to block the formation of a wall-normal vortex from forming in a flow path of the air-inlet duct.

Designs in accordance with the present disclosure provide a particle separator 20 arranged to block the formation of wall-normal vortexes 48 from forming in the particle separator 20 as suggested in FIG. 2. In some embodiments, the particle separator 20 includes an outer wall 22 formed to include a plurality of apertures 52 arranged to block the formation of a wall-normal vortex 48. In some embodiments, an inner wall 24 or an intermediate wall of the particle separator 20 is formed to include a plurality of apertures 52 arranged to block the formation of a wall-normal vortex 48.

Figure 3:
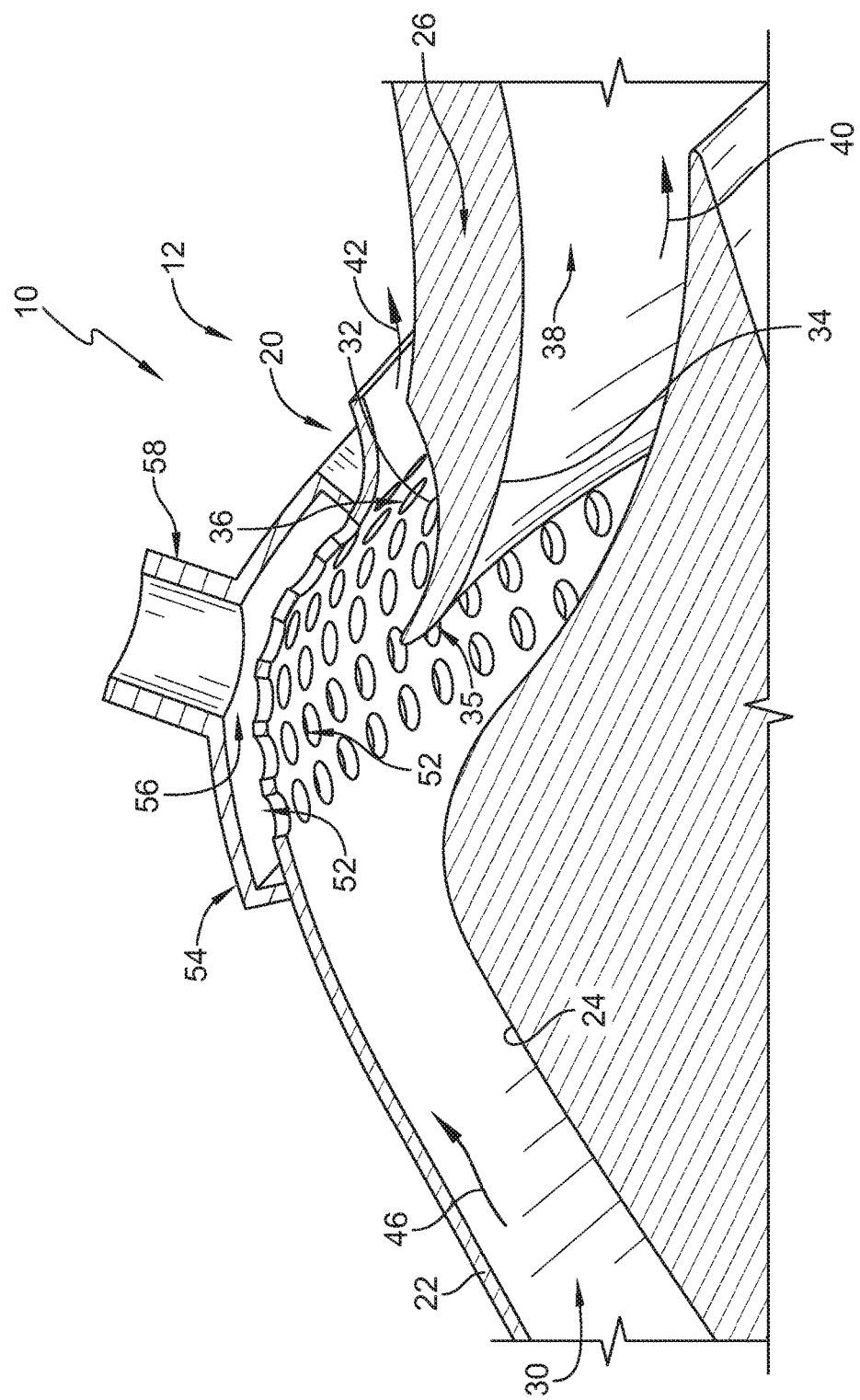
FIG. 3 is a sectional and perspective view of the air-inlet duct shown in FIG. 2.

The illustrative air-inlet duct 12 includes the outer wall 22, the inner wall 24, and a splitter 26 as shown in FIG. 2. The outer wall 22 is annular and is located in spaced-apart relation to an engine rotation axis 28. The inner wall 24 is also annular and is located between the outer wall 22 and the engine rotation axis 28. The inner wall 24 and the outer wall 22 cooperate to define an air-inlet passageway 30 therebetween as shown in FIGS. 2 and 3. The splitter 26 is located between the outer wall 22 and the inner wall 24. The splitter 26 illustratively cooperates with the outer wall 22 to establish the particle separator 20.

The splitter 26 includes an outer splitter surface 32 and an inner splitter surface 34 that define a splitter rim 35 at a forward end of the splitter 26 as shown in FIGS. 2 and 3. The outer splitter surface 32 cooperates with the outer wall 22 to define a scavenge channel 36 therebetween. The scavenge channel 36 is configured to receive and direct a dirty flow 42 including a mixture of air and particles into a scavenge chamber 44 as shown in FIG. 2. In some embodiments, the scavenge chamber 44 is configured to direct the dirty flow 42 out of the engine 10 into the atmosphere. In other embodiments, the dirty flow 42 is directed elsewhere in the engine or nacelle. The inner splitter surface 34 cooperates with the inner wall 24 to define an engine channel 38 therebetween. The engine channel 38 is configured to direct the clean flow 40 of air into the compressor sections 14 of the gas turbine engine 10.

In use, the air-inlet duct 12 draws an inlet flow 46 through an inlet 31 and into the gas turbine engine 10 as suggested in FIG. 2. The inlet flow 46 includes air and particles entrained in the air. The particle separator 20 causes the clean flow 40 and the dirty flow 42 to be established as the inlet flow 46 moves through the air-inlet duct 12.

In some particle separators, a wall-normal vortex 48 (sometimes called a cyclone 48) forms in the inlet flow 46 as suggested in FIG. 2. The wall-normal vortex 48 may grow from the outer wall 22 toward the inner wall 24 in a region upstream of the splitter 26. In particular, the vortex 48 may form in a region upstream and neighboring an inlet of the scavenge channel 36. The apertures 52 may be formed in the outer wall 22 in locations where the vortexes 48 are likely to form. In other embodiments, the vortex 48 may grow from an inner wall toward an outer wall.

Wall-normal vortexes 48 may decrease the efficiency of particle separators. For example, the wall-normal vortex 48 may block particles from entering the scavenge channel 36 and cause the blocked particles to enter the engine channel 38. As another example, the wall-normal vortex 48 may draw particles out of the scavenge channel 36 and cause the particles to enter the engine channel 38. Wall-normal vortexes 48 may have a greater effect on relatively fine particles (about 25 microns or smaller) than relatively large particles.

In the illustrative embodiment, the outer wall 22 is formed to include the plurality of apertures 52 arranged to extend radially through the outer wall 22 of the air-inlet duct 12 as shown in FIGS. 2 and 3. The plurality of apertures 52 cooperates with solid portions of the outer wall 22 to reduce or eliminate the formation of wall-normal vortexes 48 in the air-inlet duct 12. In some embodiments, the plurality of apertures 52 are located axially forward of and/or adjacent the splitter 26 to reduce or eliminate the wall-normal vortexes 48 from being formed ahead of the splitter 26. As such, the particles suspended in the flow are free to flow into the scavenge channel 36. The apertures 52 are configured to allow portions of the dirty flow 42 to move through the outer wall 22 in either direction to block formation of vortexes 48. For example, portions of the dirty flow 42 may flow from the air-inlet passageway 30 through the apertures 52 into a cavity 56 and portions of the dirty flow 42 may flow from the cavity 56 through the apertures 52 into the air-inlet passageway 30 to block formation of vortexes 48.

The location, number, and size of the apertures 52 may be varied. In the illustrative embodiment, the apertures 52 are spaced apart circumferentially from one another around the axis 28. In some embodiments, the outer wall 22 may include only a single aperture 52. In the illustrative embodiment, the apertures 52 are circular. In some embodiments, the apertures 52 are angled relative to the outer wall 22 to direct the flow of air through the apertures 52. One or more apertures 52 may be formed in the outer wall 22 and may be spaced apart circumferentially from one another. In another example, the spacing between the apertures 52 may be generally equal or varied between neighboring apertures 52.

In some embodiments, the apertures 52 are formed into elongated slots. The elongated slots may be formed in the outer wall 22 and arranged to extend ahead of the vortex region 48, adjacent to the vortex region 48, and through the vortex region 48 and into the scavenge channel 36. The elongated slots may be arranged to extend axially along the outer wall 22, circumferentially along the outer wall 22, and/or diagonally (e.g., both axially and circumferentially) along the outer wall 22.

In the illustrative embodiment, the air-inlet duct 12 further includes a housing 54 arranged radially outwardly of the outer wall 22 and arranged around the plurality of apertures 52 as shown in FIGS. 2 and 3. The housing 54 and the outer wall 22 cooperate to define a cavity 56. In the illustrative embodiment, the housing 54 includes a port 58 that opens into the cavity 56. In some embodiments, a portion of the air that flows into the cavity 56 is directed out of the cavity 56 through the port 58. In some embodiments, airflow or other fluid may be directed into the cavity 56 through port 58. Illustratively, the plurality of apertures 52 open into the cavity 56 to provide fluid communication between the air-inlet passageway 30 and the cavity 56. In some embodiments, the housing 54 is self-enclosed so that only the plurality of apertures 52 are in fluid communication with the cavity 56.

The illustrative air-inlet duct 12 comprises an inward turning particle separator 20 as shown in FIG. 2. In other embodiments, the air-inlet duct 12 comprises an inward turning particle separator, outward turning particle separator, linear type particle separator, dual path type particle separator, multi-path particle separators, or any combination thereof. In some separators such as, for example, outward turning separators, the inner wall 24 or any other suitable surface may be formed to include the plurality of apertures 52 for blocking vortexes.

Figure 4:
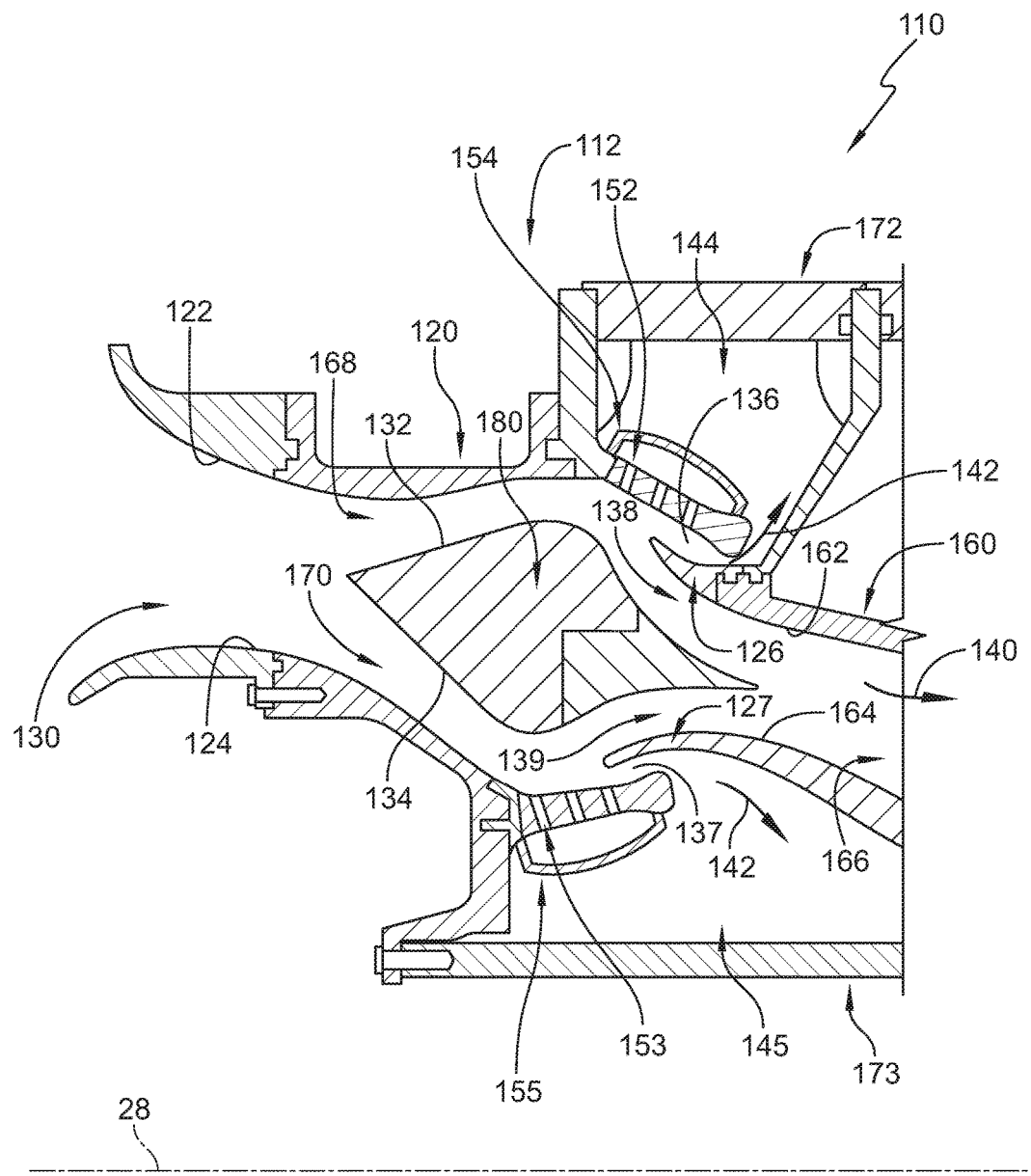
FIG. 4 is a view similar to FIG. 2 showing another embodiment of an air-inlet duct comprising a particle separator.

Another embodiment of an air-inlet duct 112 in accordance with the present disclosure is shown in FIG. 4. The air-inlet duct 112 is substantially similar to the air-inlet duct 12 shown in FIGS. 1-3 and described herein. Accordingly, similar reference numbers in the 100 series indicate features that are common between the air-inlet duct 12 and the air-inlet duct 112. The description of the air-inlet duct 12 is incorporated by reference to apply to the air-inlet duct 112, except in instances when it conflicts with the specific description and the drawings of the air-inlet duct 112.

The air-inlet duct 112 comprises a dual type particle separator 120 as shown in FIG. 4. The illustrative air-inlet duct 112 includes an outer wall 122, an inner wall 124, and a center body 180 as shown in FIG. 4. The outer wall 122 is located in spaced-apart relation to the engine rotation axis 28 as shown in FIG. 4. The inner wall 124 is located between the outer wall 122 and the engine rotation axis. The inner wall 124 and the outer wall 122 cooperate to define an air-inlet passageway 130 therebetween. The center body 180 is located between the outer wall 122 and the inner wall 124 and cooperates with an outer splitter 126 and an inner splitter 127 to establish the particle separator 120.

The center body 180 includes an outer body surface 132 and an inner body surface 134 as shown in FIG. 4. The outer body surface 132 cooperates with the outer wall 122 to define an outer channel 168 therebetween. The inner body surface 134 cooperates with the inner wall 124 to define an inner channel 170 therebetween. An outer flow of air and particles is conducted through the outer channel 168 and an inner flow of air and particles is conducted through the inner channel 170.

The outer splitter 126 and the outer wall 122 cooperate to define a first scavenge channel 136 as shown in FIG. 4. The inner splitter 127 and the inner wall 124 further cooperate to define a second scavenge channel 137. The scavenge channels 136, 137 are configured to receive and direct a dirty flow 142 including a mixture of air and particles into scavenge chambers 144, 145 defined by scavenge manifolds 172, 173 as shown in FIG. 4.

The air-inlet duct 112 further includes an intake duct 160 that includes the outer and inner splitters 126, 127. The intake duct includes an outer intake surface 162 and an inner intake surface 164 as shown in FIG. 4. The outer body surface 132 cooperates with the outer intake surface 162 to define a first engine channel 138 therebetween. The inner body surface 134 cooperates with the inner intake surface 164 to define a second engine channel 139 therebetween. Illustratively, the first and second engine channels 138, 139 converge into a single channel 166 as shown in FIG. 4. The engine channels 138, 139 are configured to direct a clean flow 140 of air into the compressor section 14 of the gas turbine engine 10.

In illustrative embodiments, the outer wall 122 is formed to include a plurality of apertures 152 arranged to extend radially through the outer wall 122 as shown in FIG. 4. The inner wall 124 is formed to include a plurality of apertures 153 arranged to extend radially through the inner wall 124. The plurality of apertures 152,153 reduce or eliminate the formation of wall-normal vortexes in the air-inlet duct 112, specifically within channels 168, 170.

In the illustrative embodiment, the air-inlet duct 112 further includes an outer housing 154 and an inner housing 155 as shown in FIG. 4. The outer housing 154 is located in the scavenge manifold 172. The outer housing 154 is arranged radially outward of the outer wall 122 around the plurality of apertures 152. The inner housing 155 is located in the scavenge manifold 173. The inner housing 155 is arranged radially inward of the inner wall 124 around the plurality of apertures 153.

Illustratively, each housing 154, 155 is self-enclosed as show in FIG. 4. In other embodiments, the housings 154, 155 include ports. The ports allow fluid communication through the housings 154, 155 into scavenge chambers 144, 145. The scavenge manifolds 172, 173 are arranged to receive the dirty flow directed into the scavenge chambers 144, 145 and any flow of air directed through the housings 154, 155. The scavenge manifolds 172, 173 are arranged to direct the captured dirty flow to atmosphere, to the engine nacelle, or elsewhere in the engine. In some embodiments, one or both of the housings 154, 155 are omitted.

The separation of particles from the inlet flow for applications such as turboshaft, turboprop, and turbofan gas turbine engines may be important to the life of the engine. Sand ingestion may cause erosion of compressor blades and may melt in the combustor and turbine components blocking cooling flow passages. Large sand particles (greater than 50 microns) may be separated well by inertial particle separators. However, fine particles (less than 25 microns) may be difficult to remove from the inlet flow.

A wall-normal vortex may develop in inlet particle separators. Such vortexes may be unsteady in nature and may contribute to the difficulties encountered removing both large and small particles. Mitigating or elimination of the vortex in a particle separator may enhance the overall sand separation efficiency of a class of inertial particle separators.

One feature of the present disclosure may be a grate surface formed as part of the flow path of the particle separator in a region where the wall-normal vortex can form. In the illustrative embodiment, the grate does not intrude into the flow field and is positioned between the particle separator flow path and a cavity behind with which it communicates. The cavity may be located radially inward or radially outward relative to the grate. In some embodiments, open areas in the grate (such as, for example, holes, slots, etc.) of size and distribution reduce or eliminate vortex formation and avoid particle bounce that would reduce particle separation. In some embodiments, additional scavenge flow may be used to remove particles from the cavity. In some embodiments, the grate surface is on the scavenge side of the flow path opposite the splitter feature and opposite the clean leg of the particle separator.

In some embodiments, the grate communicates with the scavenge duct collection system. In some embodiments, the cavity is self-enclosed. In some embodiments, the cavity is in communication with the engine nacelle air or engine environment. The anti-wall-normal vortex features may be used in dual path type particle separators, inward turning type separators, outward turning type separators, linear type separators, and any other suitable alternative type separator.

The holes formed in the grate may be shaped to reduce the presence of surfaces from which particulate bounce would cause them to enter into the clean engine flow. In some embodiments, the grate is formed to include rectangular openings with the longer sides oriented in the flow direction axially. In some embodiments, the openings in the direction normal to the all may be inclined such as to reduce adverse bouncing from these surfaces.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct for use with a gas turbine engine, the air-inlet duct comprising an outer wall arranged circumferentially about an engine rotation axis of the air-inlet duct, an inner wall located radially between the outer wall and the engine rotation axis, the inner wall and the outer wall cooperate to define an air-inlet passageway adapted to receive a mixture of air and particles suspended in the air, and a splitter located radially between the outer wall and the inner wall and configured to separate the mixture of air and particles into a clean flow substantially free of particles and a dirty flow containing the particles, the dirty flow located adjacent the outer wall and the clean flow located radially between the dirty flow and the inner wall, wherein the outer wall is formed to include a plurality of apertures arranged to extend radially through the outer wall to block a wall-normal vortex from forming in the air-inlet passage ahead of the splitter, wherein the air-inlet duct further comprises a housing located radially outward of the outer wall, the housing cooperates with the outer wall to define a cavity, the plurality of apertures opens into the cavity to provide fluid communication between the air-inlet passageway and the cavity, and the plurality of apertures provides the only fluid inlets into and exits out of the cavity.

2. The air-inlet duct of claim 1, wherein the splitter includes an outer splitter surface that cooperates with the outer wall to define a scavenge channel and an inner splitter surface that cooperates with the inner wall to define an engine channel and the splitter is configured to direct the dirty flow into the scavenge channel and the clean flow into the engine channel.

3. The air-inlet duct of claim 2, wherein the outer splitter surface and the inner splitter surface form a splitter rim and the plurality of apertures include apertures located axially forward of the splitter rim.

4. The air-inlet duct of claim 1, wherein the plurality of apertures comprises elongated slots arranged to extend axially relative to the engine rotation axis.

5. The air-inlet duct of claim 1, wherein each of the plurality of apertures is circular.

6. An air-inlet duct comprising
an outer wall arranged circumferentially about an engine rotation axis of the air-inlet duct, the outer wall formed to include a plurality of outer apertures that extend radially through the outer wall,
an inner wall located radially between the outer wall and the engine rotation axis, the inner wall formed to include a plurality of inner apertures that extend radially through the inner wall, and the inner wall and the outer wall cooperate to define an air-inlet passageway adapted to receive a mixture of air and particles suspended in the air,
a center body located radially between the outer wall and the inner wall and configured to separate the mixture of air and particles into an outer flow and an inner flow,
an intake duct arranged to separate each of the outer and inner flows into a clean flow substantially free of particles and a dirty flow containing the particles and the inner duct being further to direct the clean flows into a compressor of a gas turbine engine.

7. The air-inlet duct of claim 6, wherein the intake duct includes an outer splitter and the plurality of outer apertures are aligned axially with the outer splitter and a least one outer aperture is located axially forward of the intake duct.

8. The air-inlet duct of claim 6, wherein the plurality of inner apertures comprises elongated slots arranged to extend axially relative to the engine rotation axis.

9. The air-inlet duct of claim 6, further comprising an inner housing located radially inward of the inner wall, the inner housing cooperates with the inner wall to define an inner cavity, and the plurality of inner apertures open into the inner cavity to provide fluid communication between the inner flow and the inner cavity.

10. The air-inlet duct of claim 9, further comprising an outer housing located radially outward of the outer wall, the outer housing cooperates with the outer wall to define an outer cavity, and the plurality of outer apertures open into the outer cavity to provide fluid communication between the outer flow and the outer cavity.

11. The air-inlet duct of claim 10, wherein the plurality of inner apertures provides the only inlets into and exits out of the housing and the plurality of outer apertures provides the only inlets into or exits out of the outer housing.

12. The air-inlet duct of claim 6, wherein the center body includes an outer body surface that cooperates with the outer wall to define the outer flow and an inner body surface that cooperates with the inner wall to define the inner flow and the intake duct includes an outer splitter that cooperates with the outer wall to define an outer scavenge channel and an inner splitter that cooperates with the inner wall to define an inner scavenge channel.

13. The air-inlet duct of claim 6, wherein the plurality of outer apertures are spaced apart from one another circumferentially and axially and each of the outer apertures are circular.

14. A method of removing particles from air moving through an air-inlet duct adapted to be used with a gas-turbine engine, the method comprising the steps of
providing an inlet flow including particles to an air-inlet duct of a gas-turbine engine,
blocking a wall-normal vortex from forming within the air-inlet duct in a region of the inlet flow, wherein a wall of the air-inlet duct is formed to include a plurality of apertures and blocking the wall-normal vortex from forming within the air-inlet duct in the region of the inlet flow includes directing the inlet flow along the wall,
separating the inlet flow into a dirty flow including substantially all the particles and a clean flow lacking substantially all the particles,
directing the dirty flow to a scavenge chamber, and
directing the clean flow to a compressor included in the gas-turbine engine
wherein the air-inlet duct includes a housing located adjacent the wall, the housing cooperates with the wall to define a cavity, and the plurality of apertures opens into the cavity to provide the only fluid inlets into and exits out of the cavity.

15. The method of claim 14, further comprising directing a portion of the dirty flow through the plurality of apertures into the cavity.

16. The method of claim 15, further comprising directing the portion of the dirty flow out of the cavity through the plurality of apertures and into atmosphere surrounding the air-inlet duct.

17. The method of claim 15, further comprising directing the portion of the dirty flow out of the cavity through the plurality of apertures and into the scavenge chamber.

* * * * *